Figure 1:
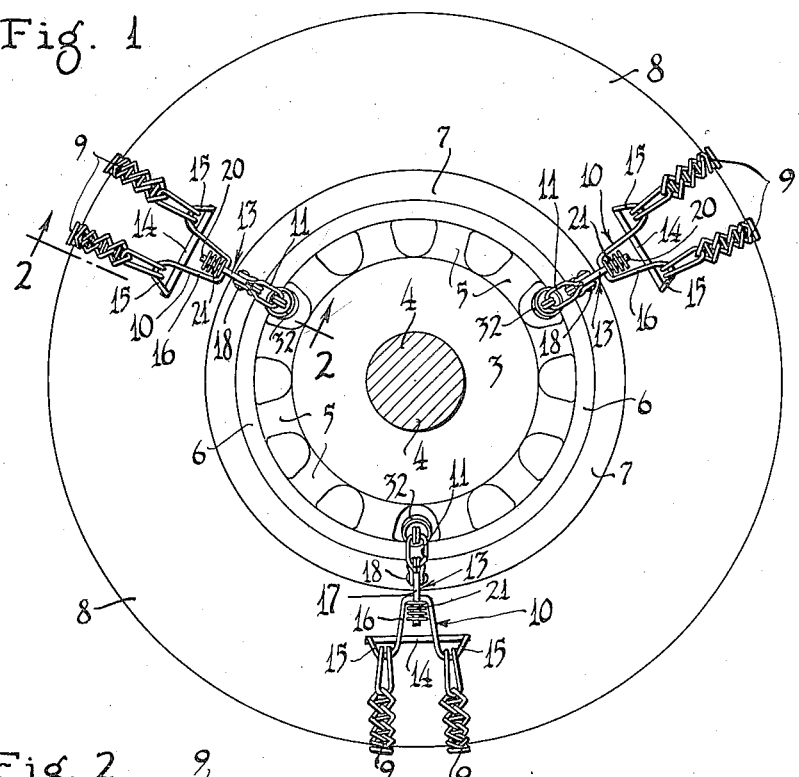

April 30, 1935.  D. C. BAMBENEK  1,999,713
TRACTION DEVICE FOR THE WHEELS OF AUTOMOTIVE VEHICLES Filed Jan. 31, 1934

INVENTOR
DOMINIC C. BAMBENEK
By His Attorneys

Patented Apr. 30, 1935

1,999,713

UNITED STATES PATENT OFFICE 1,999,713

TRACTION DEVICE FOR THE WHEELS OF AUTOMOTIVE VEHICLES

Dominic C. Bambenek, Winona, Minn., assignor to Peerless Chain Company, Winona, Minn., a corporation of Minnesota Application January 31, 1934, Serial No. 709,154

1 Claim. (Cl. 152—14)

My invention relates to traction devices for the wheels of automotive vehicles and of the type commercially known as emergency chains. Such chains usually include a plurality of tread members and a cross-tie member or chain that extends transversely around a tire between certain of the spokes of the wheel. The ends of the tread members and cross-tie chain, on each side of the tire, are attached to a connector which holds the tread chains laterally with the cross-tie chain midway therebetween.

The cross-tie chain, at one of its ends, is adjustably and detachably attached to the respective connector by a lock device. In applying the traction device to a wheel, it is preferably arranged with the lock device on the outside of the tire for the sake of easy manipulation. The cross-tie chain is attached to the lock device by inserting a part of said device through one of the links of the cross-tie chain and said chain is usually of such length as to leave one or more excess links outwardly of the lock device.

The object of this invention is to embody in the cross-tie member or connection a traction device of the above type and spring take-up device.

To the above end, generally stated, the invention consists of the novel devices and combinations of devices hereinafter described and defined in the claim.

In the accompanying drawing, which illustrates the invention, like characters indicate like parts throughout the several views.

Figure 2:
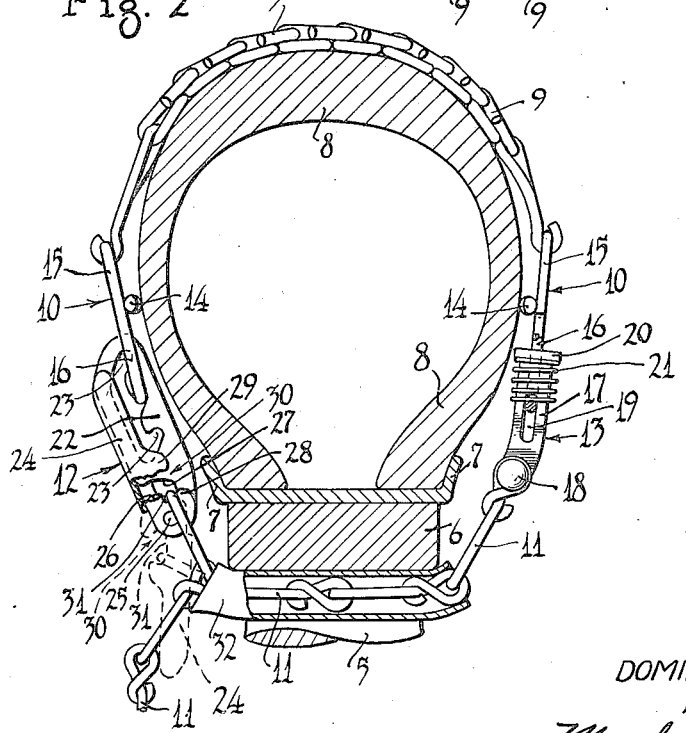

Referring to the drawing:

Fig. 1 is an inside elevation of a pneumatic tire-equipped automobile wheel diagrammatically illustrated and to which wheel is applied a plurality of emergency chains having the invention embodied therein; and Fig. 2 is a view partly in elevation and partly in section taken on the line 2—2 of Fig. 1, on an enlarged scale.

For the purpose of showing the invention applied to an automobile wheel, such a wheel is illustrated in the drawing, and of the parts thereof, it is important to note the hub 3, the axle 4, the spokes 5, the felly 6 and the rim 7 on which is mounted a pneumatic tire 8.

There is mounted on the wheel illustrated three of the improved traction devices or emergency chains and which devices are spaced equal distances apart circumferentially about the wheel and are identical, the one with the other.

Each traction device includes two laterally spaced tread chains 9, a pair of combined connectors and anti-chafing bearings 10, a cross-tie chain 11, a lock device 12, and a spring take-up device 13. The two combined connectors and anti-chafing bearings 10 connect the two tread chains 9 at their same ends and hold said chains properly spaced apart.

The combined connectors and anti-chafing bearings 10 are of novel construction and are made the subject matter of the copending application Serial Number 711,939 filed February 19, 1934.

The two combined connectors and anti-chafing bearings 10 are substantially identical, the one with the other, and each anti-chafing bearing, as shown, is a round rod 14 that extends transversely of the tread chains 9. By reference to Fig. 2 it will be noted that the two anti-chafing bearings 14 engage the sides of the tire 8 at substantially diametrically opposite points. Extending from one side of each anti-chafing bearing 14 is a pair of U-shaped end yokes 15 and extending from the other side of said bearing is a single intermediate yoke 16. These bearings 15 and 16 are formed from a single round rod that is welded or otherwise rigidly secured to the bearing 14 where the arms cross the same. The tread chains 9, at their ends, are attached to the yokes 15 of the two connectors and the lock device 12 is attached to the yoke 16 of the outer connector while the spring take-up device 13 is attached to the yoke 16 of the inner connector.

It will be noted that the arms of the intermediate yokes 16 are considerably longer than the arms of the end yokes 15, thus materially increasing the leverage thereof, for a purpose that will presently appear. The end portions of the anti-chafing bearings 14 are beveled so that they will freely slide on the sides of the tire 8 without marring or injuring the same.

The spring take-up device 13, which is the subject matter of the present application, includes a flat link 17 that extends between the ends of an open link on one end of the cross-tie chain 11 and is connected thereto by a headed pivot stud 18. Formed in the link 17, intermediate of its ends, is a longitudinally extended slot 19 through which the intermediate or transverse portion of the yoke 16 of the inner connector extends and connects the tension device 13 to said inner connector for compound pivotal and endwise sliding movements. The other or outer end of the link 17 is in the form of a T-head 20. Encircling the outer end portion of the link 17 is a coiled compression spring 21 which is held between the transverse portion of the respective yoke 16 and the T-head 20. The lock device 12 is of the type disclosed and broadly claimed in United States Letters Patent issued to Joseph B. Bambenek, September 26, 1933 under Serial Number 1,928,474, entitled "Combined slack take-up and lock device for tire chains."

The lock device 12 includes a plate 22 having a longitudinal slot through which the yoke 16 on the outer connector extends. Within the slot is a plurality of lock notches 23 for interlocking engagement with said yoke to vary the operative length of the plate 22 and take up slack in the cross-tie chain 11. The lock device 12 further includes a lock lever 24 pivotally attached at 25 to the outer end portion of the plate 22. This lever 24 is U-shaped in cross-section and the plate 22 extends between the sides thereof.

Formed within the plate 22, inwardly of its pivot 25, is a retaining lug 26 and a link-receiving pocket 27. In the sides of the lever 24 are formed pairs of hook-like lugs 28 and 29 and which pairs of lugs are reversely acting. These lugs 28 and 29 are spaced to form a contracted passageway 30 that leads to a pocket 31 in the sides of the lever 24 for one of the links of the cross-tie chain 11.

In applying the traction device to a tire, the tread chains 9 are placed transversely on the tread thereof and the cross-tie chain 11 inserted between certain of the spokes 5 and transversely over the felly 6 with the spring take-up device 13 on the inside of the tire 8. At this time the lever 24 is open, as shown by broken lines in Fig. 2, and the respective yoke 16 is in one of the lock notches 23 depending on the adjustment required to fit the traction device transversely around the tire 8. Next, the lever 24 is inserted through one of the links in the cross-tie chain 11 and the respective link hooked over the lugs 29 and said lever closed.

During the closing movement of the lever 24 the held link of the cross-tie chain 11 is carried into the pocket 31 from one side of the pivot 25 to the other and into interlocking engagement with the lugs 26 and 28 where the same is positively held. By reference to Fig. 2 it will be noted that when the lever 24 is closed, the link, in the cross-tie chain 11 held thereby, is beyond a dead center which is at the center of the pivot 25, and hence, positively holds the lever 24 closed. Closing movement of the lever 24 draws the cross-tie chain 11 endwise toward the lock device 12 and away from the spring take-up device 13 which moves the link 17 endwise on the transverse portion of the respective yoke 16 and places the spring 21 under tension.

In this application of the traction device to the tire 8, the anti-chafing bearings 14 rest on the sides of said tire and hold the connectors 15 and 16 spaced therefrom and which bearings also act as fulcrums that rockably support said connectors. Due to the increased leverage of the yokes 16 over the yokes 15, the pull on the devices 11, 12 and 13 on the yokes 16, which is downward, tends to lift the yokes 15 and hold connected links of the tread chains 9 out of contact with the sides of the tire 8. Obviously, the compression spring 21 securely holds the traction device tightly drawn transversely around the tire 8 and overcomes the tendency of centrifugal force to throw the excess links in the cross-tie chain 11 and the lock device 12, due to the extra weight thereof, radially outwardly relative to the wheel. This action of the tension device holds the traction device from shifting movement transversely on the tire 8 which would bring the lock device 12 onto the tread of said tire. Or, in other words, the spring take-up device 13 automatically takes up slack in said device during flexing of the tire 8 and positively prevents the traction device from shifting transversely around the tire 8 due to the unbalanced construction of the tension device.

The cross-tie chain 11, where the same crosses the felly 6, is encased in a rubber tube 32 to prevent the same from marring said felly.

It will be understood that the invention described is capable of various modifications within the scope of the invention herein disclosed and claimed.

What I claim is:

A connector and a spring take-up device connecting a pair of tread members in edgewise spaced relation to a cross-tie member, said connector having a yoke portion between the tread members, said take-up device including a link having a longitudinal slot, through which the yoke portion extends, and a coiled spring encircling one end portion of the link and arranged to be compressed between the yoke and link at one end, said cross-tie member being attached to the other end of the link, said connector also having a tire-engaging bearing, between the tread members and the spring take-up device, constructed and arranged to hold the connector and attached portions of the tread members and the spring take-up device out of contact with the tire.

DOMINIC C. BAMBENEK.